UNITED STATES PATENT OFFICE.

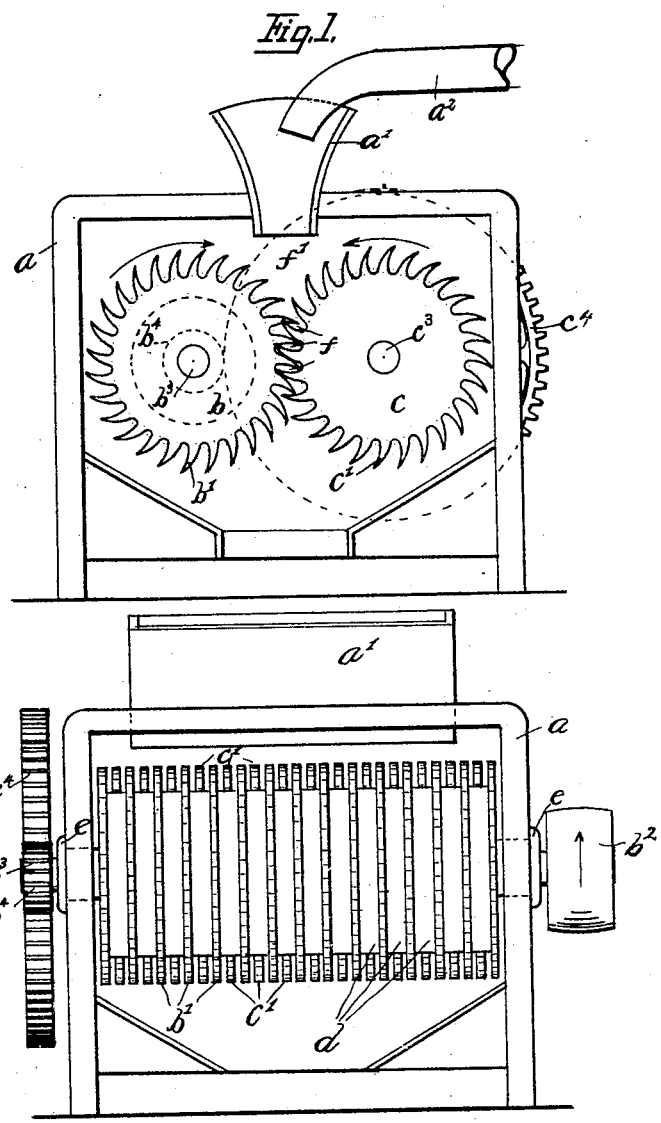

JAMES CUNNING, OF INDIANAPOLIS, INDIANA.

MACHINE FOR REDUCING OR CUTTING ENTRAILS.

No. 803,526. Specification of Letters Patent. Patented Oct. 31, 1905.

Application filed May 8, 1903. Serial No. 156,161.

*To all whom it may concern:*

Be it known that I, JAMES CUNNING, a citizen of the United States, residing at Indianapolis, in the county of Marion and State of Indiana, have invented certain new and useful Improvements in Machines for Reducing or Cutting Entrails, set forth in the following specification and illustrated in the accompanying drawings, in which similar letters of reference throughout the different figures represent similar parts.

My invention relates to devices for cutting or reducing various forms of substance—fibrous, vegetable, or muscular tissues—for food, treatment, or processing, but more especially for the reduction of the entrails of animals slaughtered and prepared for commerce where it is necessary to use water flowing through the machine, and with the matter being treated, slushing it thoroughly, washing, separating, and carrying away the waste matter from the mass of shredded tissue and fatty matter, that the latter may be more readily collected and treated, and the objects are to construct a machine that will cut, lacerate, or reduce large amounts of such matter and to do the work efficiently; further, a machine simple of construction and easy of operation.

In the drawings, Figure 1 is an end elevation of my device with walls removed, showing ends of operating-cylinders. Fig. 2 is a front elevation with casing partly removed, disclosing the operating-cylinders.

Of the letters in said figures, $a$ represents a housing incasing the operating-cylinders. $a'$ is a hopper conducting the materials to be operated upon to the operating-cylinders, preferably delivering said materials near the middle of and between said cylinders. $b$ and $c$ are the operating-cylinders, in this instance constructed of circular saws $b'$ and $c'$, with spacing-disks $d$ intervening, being built up of saws and disks in alternation, the disks being thicker than the saws and of smaller diameter, so that the teeth of the saws project beyond the periphery of said spacing-disks, the cylinders so constructed being mounted, respectively, on shafts $b^3$ and $c^3$, the former being provided with a pulley $b^2$ or other driving means and a small pinion $b^4$ and the shaft $c^3$ of cylinder $c$ being provided with a large gear $c^4$, adapted to mesh with the said pinion on shaft $b^3$, the said shafts being mounted in journal-boxes $e$ at such distance between centers that the points of the teeth of one cylinder nearly touch the spacing-disks of the other cylinder throughout the cutting-space $f$ when being rotated, and the gears meshing with each other cause a differential speed of rotation in the two cylinders, due to the unequal sizes of the gears, one cylinder rotating comparatively fast and the other slow, the periphery at the top of each cylinder turning toward the other, and, the rake of the teeth in fast cylinder being directed forwardly and the rake of the teeth in the slower cylinder being directed backwardly as compared with the peripheral direction of motion of cylinders, the teeth of swifter cylinder gather the matter being operated upon and drag it down into the gullets of the backwardly-directed teeth of the slower cylinder, and, due to the differential speed, the cutting and reducing is done very efficiently, whether the teeth are sharp or dulled.

Teeth could be provided in other ways than above specified, and I hold myself at liberty to make any alterations that fall fairly within the scope of my invention, and

What I claim as new, and desire to secure by Letters Patent, is—

In a machine for cutting and reducing entrails, two horizontally-journaled saw-toothed cylinders of equal size, the teeth being provided by a series of saws, disks of equal thicknesses placed between the saws to space them, the cylinders being so mounted that the teeth of one cylinder are adapted to cut through the spaces between the teeth of the opposite cylinder and to the said disks, means providing rotative motion in said cylinders that the upper peripheries of each rolls toward the other and one cylinder rotating at a greater speed than the other, the teeth in the higher-speeded cylinder being projected forwardly and the teeth of the lower-speeded cylinder being projected backwardly as compared with direction of its rotation as set forth.

That I claim the foregoing I hereunto subscribe my name this 2d day of May, 1903.

JAMES CUNNING.

Witnesses:
 ORA BUNDY,
 JAS. N. DUNCAN.